(12) United States Patent
Gay (10) Patent No.: US 9,647,725 B1
(45) Date of Patent: May 9, 2017

(54) WIRELESS POWER INTERFACE USING AN NFC ANTENNA

(71) Applicant: Marvell International Ltd., Hamilton HM (BM)

(72) Inventor: Michael J. Gay, Coppet (CH)

(73) Assignee: MARVELL INTERNATIONAL LTD., Hamilton (BM)

( * ) Notice: Subject to any disclaimer, the term of this patent is extended or adjusted under 35 U.S.C. 154(b) by 389 days.

(21) Appl. No.: 14/243,317

(22) Filed: Apr. 2, 2014

Related U.S. Application Data (60) Provisional application No. 61/807,479, filed on Apr. 2, 2013.

(51) Int. Cl.
*H02J 7/00* (2006.01)
*H04B 5/00* (2006.01)
*H02J 7/02* (2016.01)

(52) U.S. Cl.
CPC ............ *H04B 5/0037* (2013.01); *H02J 7/025* (2013.01)

(58) Field of Classification Search
CPC ........ H02J 7/025; H02J 5/005; H04B 5/0037; H04B 5/0031
See application file for complete search history.

(56) References Cited

U.S. PATENT DOCUMENTS

| | | | | |
|---|---|---|---|---|
| 8,847,563 B2* | 9/2014 | Callanan | ............... | H03K 17/567 323/222 |
| 2007/0064457 A1* | 3/2007 | Perreault | ............... | H02M 3/155 363/78 |
| 2010/0142509 A1* | 6/2010 | Zhu | ........................ | H04B 1/1607 370/343 |
| 2011/0127954 A1* | 6/2011 | Walley | ................. | H01M 2/0267 320/108 |
| 2012/0149301 A1* | 6/2012 | Wiley | ................... | H04B 5/0031 455/41.1 |
| 2012/0293006 A1* | 11/2012 | Kim | ...................... | H04B 5/0031 307/104 |
| 2014/0327390 A1* | 11/2014 | Park | ......................... | H02J 7/025 320/108 |
| 2015/0118956 A1* | 4/2015 | Desai | .................... | H04B 5/0037 455/41.1 |
| 2015/0180266 A1* | 6/2015 | Mcfarthing | ............ | H02J 7/0047 320/108 |

* cited by examiner

*Primary Examiner* — Nha Nguyen (57) ABSTRACT

A circuit comprises an antenna and a first port coupled to the antenna using a first reactive circuit. A first switching device is coupled across first and second input nodes of the first port, and configured to convey a signal across the first and second input nodes to a Near Field Communication (NFC) circuit in a first mode, and to isolate the NFC circuit from the antenna in a second mode. The antenna has a first resonance at a first frequency in a first mode and has a second resonance at a second frequency in a second mode. A second port is coupled to the antenna using a second reactive circuit. A rectifier has an input coupled to the second port and an output coupled to an energy storage device. A second switching device is coupled across the second port and configured to control an amount of current flowing through the rectifier by alternating between a first state and a second state at a third frequency when the circuit is in the second mode.

10 Claims, 6 Drawing Sheets

WIRELESS POWER INTERFACE USING AN NFC ANTENNA

CROSS-REFERENCE TO RELATED APPLICATION

This present disclosure claims the benefit of U.S. Provisional Application No. 61/807,479, "A4WP interface using a mobile telephone NFC antenna," filed on Apr. 2, 2013, which is incorporated by reference herein in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A wireless power interface uses an inductively-coupled loop antenna to provide power for a device without a physical connection or contact with the device. The Alliance for Wireless Power (A4WP™) has developed a wireless power interface suitable for, among other things, charging a battery of a mobile device.

An A4WP interface transfers power from a transmitting antenna to a receiving antenna using a 6.78 MHz magnetic field. The transmitting antenna and the receiving antenna are tuned to resonate at 6.78 MHz. A voltage induced on the receiving antenna can be high, and may exceed the maximum voltages that can be handled by an integrated circuit technology used in a portable device such as a mobile phone or tablet.

Operation of the A4WP interface includes the generation of a wide range of voltages on outputs of the receiving antenna. Furthermore, a charging current delivered from the A4WP interface to a battery must be controlled to avoid damaging the battery.

Near Field Communication (NFC) is a standard for short-range wireless communication between two devices. An NFC communication uses inductively-coupled loop antennas to transfer information between devices using a 13.56 MHz magnetic field. The NFC antennas are tuned to resonate at 13.56 MHz. Voltages generated on the NFC antennas during NFC operations are generally low.

An antenna suitable for both A4WP power reception and for NFC communications is tuned to resonate at 6.78 MHz during an A4WP wireless charging operation and tuned to resonate at 13.56 MHz during an NFC operation. Components connected to the antenna are selected to withstand the voltages generated on the antenna during the A4WP wireless charging operation.

BRIEF SUMMARY

In an embodiment of the disclosure, an apparatus includes an antenna and a first port coupled to the antenna using a first reactive circuit. The first port has first and second input nodes. A first switching device is coupled across the first and second input nodes of the first port, and is configured to convey a signal across the first and second input nodes to a Near Field Communication (NFC) circuit in a first mode, and to isolate the NFC circuit from the antenna in a second mode. The antenna has a first resonance at a first frequency in the first mode and has a second resonance at a second frequency in a second mode. A second port is coupled to the antenna using a second reactive circuit. A rectifier has an input coupled to the second port and an output coupled to an energy storage device. A second switching device is coupled across the second port and controls an amount of current flowing through the rectifier by alternating between a first state and a second state at a third frequency when the circuit is in the second mode.

In an embodiment of the disclosure, a method includes receiving a mode signal at a circuit. The method includes tuning an antenna to a first frequency when the received mode signal is a first signal and tuning the antenna to a second frequency when the received mode signal is a second signal. The method also includes controlling a current flowing through a rectifier for charging an energy storage device coupled to the rectifier by alternating a switching device between a first state and a second state at a third frequency equal to or higher than the second frequency. The current flows through the rectifier when the switching device is in the first state.

DETAILED DESCRIPTION

Figure 1:
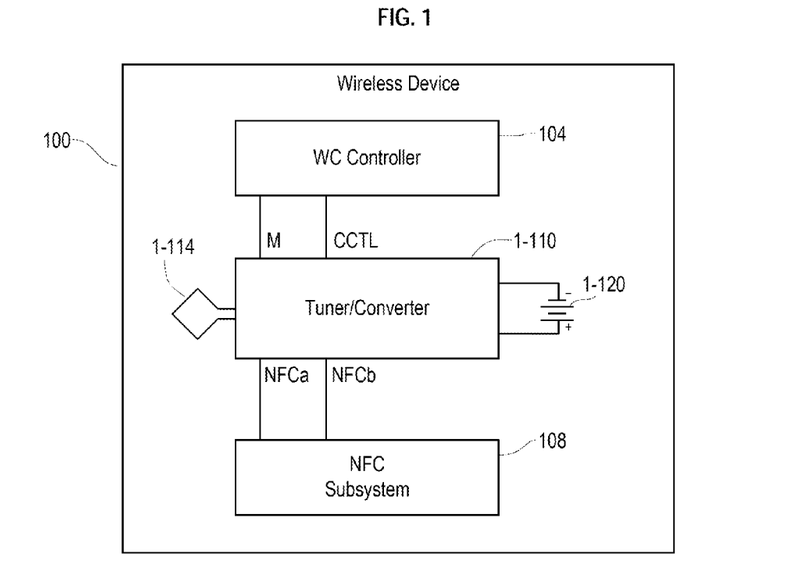
FIG. 1 is a block diagram of wireless device having an antenna used for wireless charging and for NFC communications, according to an embodiment.

FIG. 1 is a block diagram of a wireless device 100 including a tuner/converter 1-110 connected to a loop antenna 1-114 and to a battery 1-120. The battery 1-120 is an energy storage device and may include one or more of an electrochemical cell, a supercapacitor, and so on. The wireless device 100 further includes a wireless charging (WC) controller 104 and an NFC subsystem 108. For example, the wireless device includes a cellular phone, personal digital assistant, tablet computer, laptop computer, two-way radio, wireless headphone, wireless headset, wireless controller, or other battery-powered electronic device.

A mode signal M generated by the WC controller 104 configures the tuner/converter 1-110. When the mode signal M receives a first mode signal, e.g., an NFC mode signal, the tuner/converter 1-110 is configured into a first mode for an NFC operation. When the mode signal M receives a second mode signal, e.g., a WC mode signal, the tuner/converter 1-110 is configured into a second mode for a WC operation. In an embodiment, the mode signal M may be generated in response to a wireless communication received by the wireless device 100, and based on whether the battery 1-120 was fully charged and whether the NFC operation has priority over the WC operation.

The tuner/converter 1-110 tunes the antenna 1-114 to a frequency according to the mode signal M. In addition, when the tuner/converter 1-110 is configured for a WC operation, the tuner/converter 1-110 charges the battery 1-120 according to a charging control signal CCTL.

The tuner/converter 1-110 receives the charging control signal CCTL from the WC controller 104. During the WC operations, the WC controller 104 controls the charging of the battery 1-120 using the charging control signal CCTL. In an embodiment, the WC controller 104 is an A4WP interface controller.

The tuner/converter 1-110 is connected to the NFC subsystem 108 through an NFC port having a first NFC pad NFCa and a second NFC pad NFCb. The first and second NFC pads NFCa and NFCb each include a node of a circuit of the tuner/converter 1-110. During the NFC operation, the NFC subsystem 108 transmits and receives NFC signals using the NFC pads NFCa and NFCb, and the tuner/converter 1-110 couples the NFC signals to the antenna 1-114. During the WC operation, the tuner/converter 1-110 protects the NFC subsystem 108 from high voltages induced on the antenna 1-114.

Figure 2A:
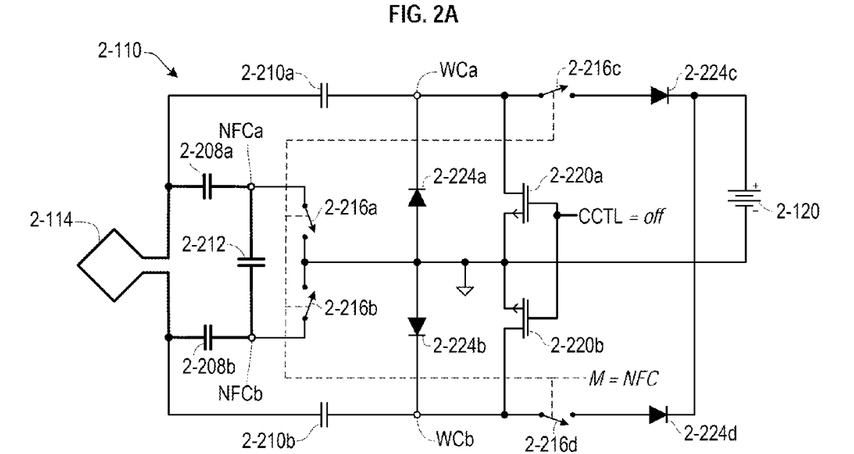
FIGS. 2A-2C are views of a circuit diagram of a tuner/converter, each view of the circuit diagram showing an operation of the circuit according to an embodiment.
Figure 2B:
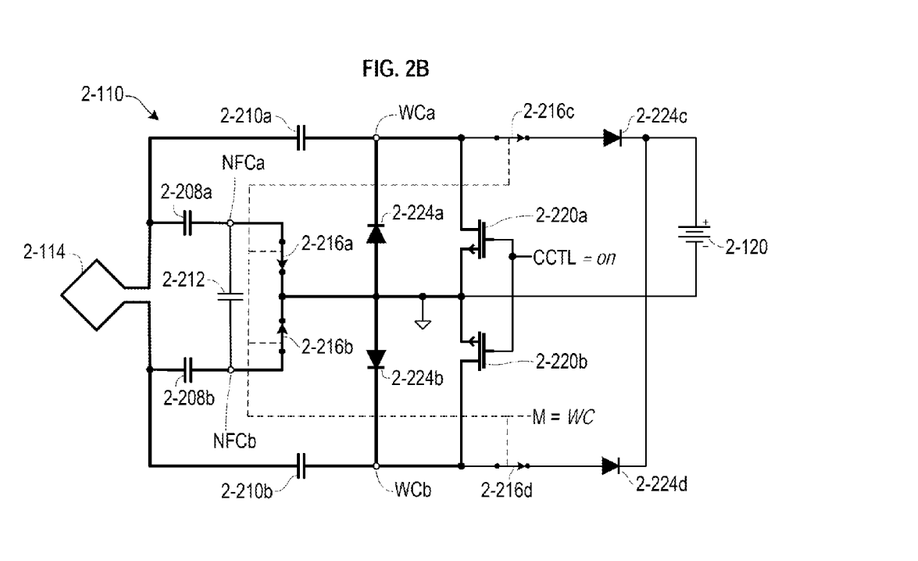
Figure 2C:
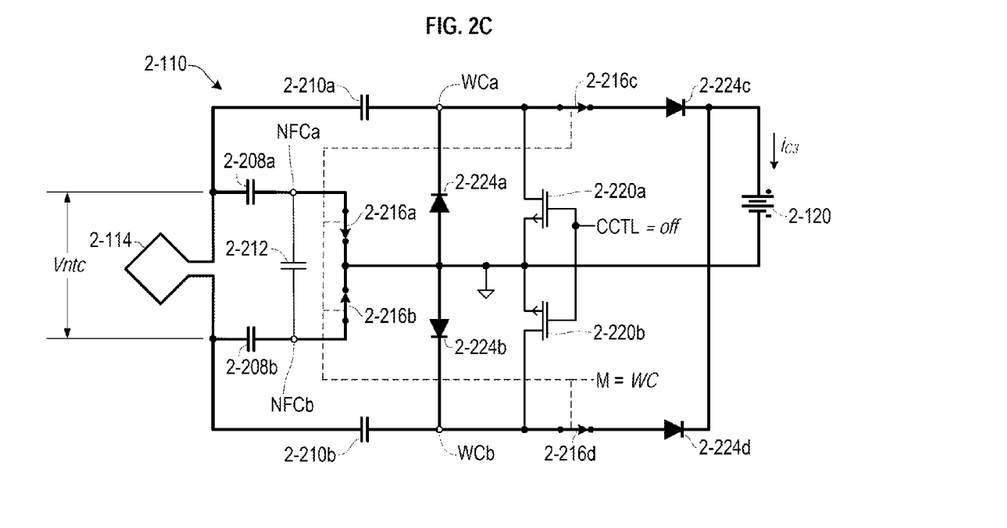

FIGS. 2A-2C are views of a circuit diagram of a circuit 2-110 suitable for use in tuner/converter 1-110 of FIG. 1, according to an embodiment. Each of the views of the circuit 2-110 shows an operation of the circuit 2-110.

The circuit 2-110 includes an antenna 2-114. A first terminal of the antenna 2-114 is connected to a first terminal of a first NFC tuning capacitor 2-208a and a first terminal of a WC tuning capacitor 2-210a. A second terminal of antenna 2-114 is connected to a first terminal of a second NFC capacitor 2-208b, and a first terminal of a second WC tuning capacitor 2-210b.

A second terminal of the first NFC tuning capacitor 2-208a is connected to a first terminal of a third NFC tuning capacitor 2-212 and to a first NFC pad NFCa. The first NFC pad NFCa is connected to a first terminal of a first switch 2-216a.

A second terminal of the second NFC tuning capacitor 2-208b is connected to a second terminal of the third NFC tuning capacitor 2-212 and to a second NFC pad NFCb. The second NFC pad NFCb is connected to a first terminal of a second switch 2-216b.

The switches 2-216a and 2-216b, as well as a third switch 2-216c and a fourth switch 2-216d discussed below, can be any of a number of well-known switching means suitable to their respective purposes, the well-known switch means including a Bipolar Junction Transistor (BJT) or a Field-Effect Transistor (FET).

A mode signal M controls the first through fourth switches (or switching devices) 2-216a through 2-216d. When the mode signal M includes an NFC mode signal, the first through fourth switches 2-216a through 2-216d are open. When the mode signal M includes a WC mode signal, the first through fourth switches 2-216a through 2-216d are closed.

A second terminal of the first switch 2-216a is connected to a second terminal of the second switch 2-216b and to a ground.

Capacitances of the NFC tuning capacitors 2-208a, 2-208b, and 2-212 are determined according to an inductance of the antenna 2-114 so that the antenna 2-114 is tuned to a frequency used in an NFC operation, for example, a 13.56 MHz frequency. In an embodiment, a capacitance of the first NFC tuning capacitor 2-208a is equal to a capacitance of the second NFC tuning capacitor 2-208b. The types, ratings, and capacitance values for the NFC tuning capacitors 2-208a, 2-208b, and 2-212 are determined according to characteristics of the antenna 2-114 and the NFC operation frequency. In an embodiment, the NFC tuning capacitors 2-208a, 2-208b, and 2-212 define a first reactive circuit.

A second terminal of the first WC tuning capacitor 2-210a is connected to a first wireless charging (WC) pad WCa. A second terminal of the second WC tuning capacitor 2-210b is connected to a second WC pad WCb.

Capacitances of the WC tuning capacitors 2-210a and 2-210b are determined according to the inductance of the antenna 2-114 and the capacitances of the first and second NFC tuning capacitors 2-208a and 2-208b so that the antenna 2-114 is tuned to a frequency of an WC operation when the switches 2-216a and 2-216b are closed, for example, a 6.78 MHz frequency of A4WP WC operation. In an embodiment, the capacitances of the first and second WC tuning capacitor 2-208a are a same capacitance.

The types, ratings, and capacitance values for the WC tuning capacitors 2-210a and 2-210b are determined according to characteristics of the antenna 2-114, the capacitance values of the first and second NFC tuning capacitors 2-208a and 2-208b, and the WC operation frequency. In an embodiment, a capacitance value of each of the WC tuning capacitors 2-210a and 2-210b are substantially equal to three times a capacitance value of the NFC tuning capacitors 2-208a and 2-208b.

Note that when the switches 2-216a and 2-216b are closed during a WC operation, the third NFC tuning capacitor 2-212 is shorted across. Accordingly, the capacitance of the third NFC tuning capacitor does not affect the tuning of the antenna 2-214. Furthermore, when the switches 2-216a and 2-216b are closed the NFC port having NFC pads NFCa and NFCb is protected against voltages generated during the WC operation.

A cathode of a first diode 2-224a, a first switched terminal of a first transistor 2-220a, and a first terminal of a third switch 2-216c are connected to the first WC pad WCa.

A cathode of a second diode 2-224b, a first switched terminal of a second transistor 2-220b, and a first terminal of a fourth switch 2-216c are connected to the second WC pad WCb.

An anode of the first diode 2-224a, an anode of the second diode 2-224b, a second switched terminal of the first transistor 2-220a, and a second switched terminal of the second transistor 2-220b are connected to the ground.

A charging control signal CCTL is connected to a control terminal of the first transistor 2-220a and a control terminal of the second transistor 2-220b. The transistors 2-220a and 2-220b operate as switching means. Accordingly, when the charging control signal CCTL includes an off signal, the first and second transistors both turn off, and the respective first switch terminals and the second switched terminals of the first and second transistors are electrically disconnected, that is, open. When the charging control signal CCTL includes an on signal, the first and second transistors both turn on, and the respective first switch terminals and the second switched terminals of the first and second transistors are electrically connected, that is, closed.

A second terminal of the third switch 2-216c is connected to an anode of a third diode 2-224c. A second terminal of the fourth switch 2-216d is connected to an anode of a fourth diode 2-224d. When the third and fourth switches 2-216c and 2-216d are open, the third and fourth diodes 2-224c and 2-224d are electrically disconnected from the WC pads WCa and WCb, respectively. When the third and fourth switches 2-216c and 2-216d are closed, the third and fourth diodes 2-224c and 2-224d are electrically connected to the WC pads WCa and WCb, respectively.

The functionality provided using the first through fourth diodes 2-224a through 2-224d and the third and fourth switches 2-216c and 2-216d could be realized using an active rectifier circuit using well-known means. An input of the rectifier circuit refers to a terminal or node connected to an unrectified current, and an output of the rectifier circuit refers to a terminal or node that produces a rectified current.

A positive terminal of a battery 2-120 is connected to a cathode of the third diode 2-224c and a cathode of the fourth diode 2-224d. A negative terminal of the battery 2-120 is connected to the ground.

The view of the circuit 2-110 in FIG. 2A shows the circuit 2-110 configured for an NFC operation, with the mode signal M receiving an NFC signal and the charging control signal CCTL receiving an off signal. Accordingly, the first through fourth switches 2-216a through 2-216d in an open state and the first and second transistors 2-220a and 2-220b are off. Components of the circuit 2-110 that are active while the circuit 2-110 is configured for an NFC operation are shown in FIG. 2A using bold lines.

During the NFC operation, the third and fourth switches 2-216c and 2-216d and the transistors 2-220a and 2-220b are subjected to a peak coil voltage, the peak coil voltage being, for example, 10 to 12 volts in an NFC circuit conforming to the NFC standards. To prevent current flow through the WC tuning capacitors 2-210a and 2-210b during the NFC operation, the third and fourth switches 2-216c and 2-216d and the transistors 2-220a and 2-220b have breakdown voltages above the peak coil voltage. In an embodiment, the WC tuning capacitors 2-210a and 2-210b define a second reactive circuit.

While the circuit 2-110 is configured for an NFC operation, a negative peak voltage at each of the WC pads WCa and WCb is clamped to a diode forward voltage below ground by the first and second diodes 2-224a and 2-224b. A positive peak voltage across the WC pads WCa and WCb is close to a peak coil voltage, for example, 12 volts. Under a steady state condition, currents do not flow through the WC tuning capacitors 2-210a and 2-210b and as a result the WC tuning capacitors 2-210a and 2-210b do not affect a tuning of the antenna 2-114 during an NFC operation.

FIGS. 2B and 2C show the circuit 2-110 configured for a WC operation with the mode signal M receiving a WC mode signal. FIG. 2B shows a non-charging portion of the WC operation, and FIG. 2C shows a charging portion of the WC operation. Components that are active while the circuit 2-110 is configured for each of the charging and non-charging portions of the WC operation are shown in FIGS. 2B and 2C, respectively, using bold lines.

Figure 3:
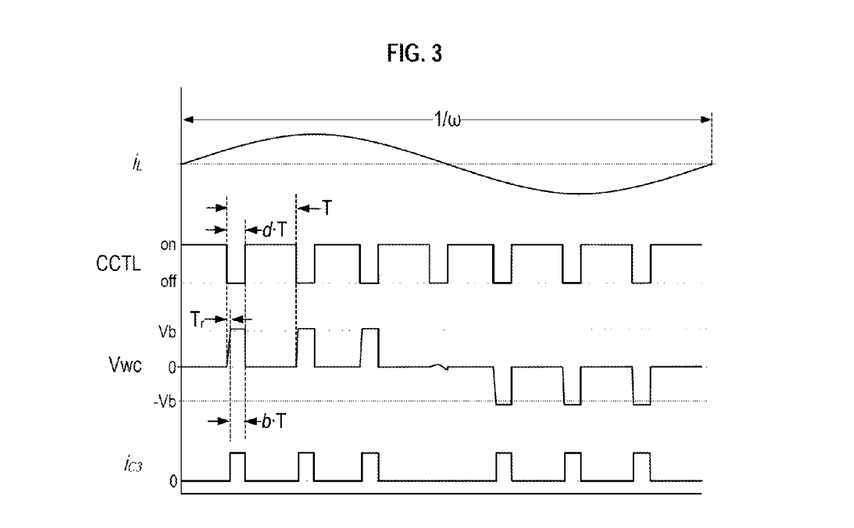
FIG. 3 depicts waveforms related to the circuit of FIG. 2.

FIG. 3 shows waveforms related to the circuit 2-110 during the WC operation. A coil current $i_L$ in the antenna 2-114 oscillates at a WC frequency $\omega$ according to a magnetic field coupled to the antenna 2-114. The charging control signal CCTL alternates between an off signal and an on signal at a rate having a clock period T. A CCTL off duration d·T during each cycle of the charging control signal CCTL is equal to a CCTL duty cycle d times the clock period T. A circulating current $i_{C3}$ is a current flowing through the battery 2-120.

A charging voltage Vwc shows a voltage across the WC pads WCa and WCb generated during the WC operation. The charging voltage Vwc includes a Vwc rise time $T_r$ and a charging period b·T equal to the CCTL off duration d·T minus the Vwc rise time $T_r$, where b is a charging duty cycle. Equivalently, the charging duty cycle b is determined according to Equation 1:

$$b = d - \frac{T_r}{T} \qquad \text{Equation 1}$$

The determination of the charging voltage Vwc and the Vwc rise time $T_r$ are discussed below.

During the WC operation, the circuit 2-110 operates as a switch mode converter to charge the battery 2-120 using the energy stored in the antenna 2-114. The charging control signal CCTL alternates between the on signal and the off signal at a clock frequency equal to the inverse of the clock period T, the clock frequency being substantially higher than the WC frequency $\omega$ induced on the antenna 2-114. In an embodiment, the clock frequency is more than twice the WC frequency $\omega$. In an embodiment including an A4WC wireless charging operation, the WC frequency $\omega$ is 6.78 MHz and the charging control signal CCTL has a clock frequency between a 50 to 100 MHz.

The NFC pads NFCa and NFCb are shorted together by the first and second switches 2-216a and 2-216b, and as a result a voltage across the NFC pads NFCa and NFCb is substantially zero. Accordingly, the NFC pads NFCa and NFCb are protected from voltages induced on the antenna 2-114.

FIG. 2B shows the circuit 2-110 configured for a non-charging portion of a WC operation with the mode signal M receiving a WC mode signal and the charging control signal CCTL receiving an on signal. Accordingly, the first through fourth switches 2-224a through 2-224d are closed and the first and second transistors 2-220a and 2-220b are on.

During the non-charging portion of the WC operation, the antenna 2-114, the NFC tuning capacitors 2-208a and 2-208b, and the WC capacitors 2-210a and 2-210b form a resonant circuit that oscillates at the WC frequency $\omega$ induced on the antenna 2-114. The current through the capacitors 2-210a and 2-210b circulates through the switches 2-220a and 2-220b during the non-charging portion of the WC operation. A coil current $i_L$ having the WC frequency $\omega$ circulates through the resonant circuit.

The WC pads WCa and WCb are shorted together by the first and second transistors 2-220a and 2-220b, and as a result the magnitude of the charging voltage Vwc across the WC pads WCa and WCb is substantially zero. Accordingly, the WC pads WCa and WCb are protected from voltages induced on the antenna 2-114.

FIG. 2C shows the circuit 2-110 configured for a charging portion of a the WC operation, with the mode signal M receiving a WC mode signal and the charging control signal CCTL receiving an off signal. Accordingly, the first through fourth switches 2-216a through 2-216d are in a closed state and the first and second transistors 2-220a and 2-220b are off Components that are active while the circuit 2-110 is configured for the charging portion of the WC operation are shown using bold lines.

Because the first and second transistors 2-220a and 2-220b are off, the current flowing in the antenna 2-114 flows through another path. During the charging portion of the WC operation, the current flowing in the antenna 2-114 flows through the capacitors 2-210a and 2-210b and then through the diode 2-224c, the battery 2-120, and the diode 2-224b or through the diode 2-224d, the battery 2-120, and the diode 2-224a, according to the polarity of the antenna coil voltage. As a result, a magnitude of a charging voltage Vwc across the WC pads WCa and WCb increases to a threshold value sufficient to permit a charging current $I_{C3}$ to flow through the first through fourth diodes 2-224a through 2-224d and the battery 2-120, the first through fourth diodes 2-224a through 2-224d forming a full-wave rectifier having an output connected to the battery 2-120. Specifically, when the charging voltage Vwc is positive and has a magnitude equal to the threshold value, the charging current $I_{C3}$ flows through the third diode 2-224c, the battery 2-120, and the second diode 2-224b. When the charging voltage Vwc is negative and has a magnitude equal to the threshold value, the charging current $I_{C3}$ flows through the fourth diode 2-224d, the battery 2-120, and the first diode 2-224a.

Before the current flow through the first through fourth diodes 2-224a through 2-224d and the battery 2-120, an NFC tuning capacitor voltage $V_{ntc}$ measured from the first terminal of the first NFC tuning capacitor 2-208a and the first terminal of the second NFC tuning capacitor 2-208b, as shown in FIG. 2C, increases by a battery voltage $V_b$ equal to the voltage of the battery 2-120 plus two forward bias voltages. A rise time $T_r$ of the NFC tuning capacitor voltage $V_{ntc}$ is determined according to Equation 2:

$$T_r = \frac{V_b \cdot C_1}{i_L} \qquad \text{Equation 2}$$

wherein capacitance $C_1$ is the combined capacitances of the first and second NFC tuning capacitors 2-208a and 2-208b and $i_L$ is the coil current flowing in the antenna 2-114 when the first and second transistors 2-220a and 2-220b are turned off. In an embodiment, the rise time $T_r$ is a small fraction of the CCTL on duration d·T.

In an embodiment, current flows to the battery during the charging interval b·T, the charging interval b·T being substantially shorter than the clock period T. In the absence of an energy transfer to the battery 2-120, the coil current $i_L$ is approximately constant during the non-charging portion of the WC operation. When energy is transferred to the battery 2-120, then the change $\delta i_1$ in the coil current $i_L$ is determined according to Equation 3:

$$\frac{i_1^2 \cdot L}{2} - \frac{(i_1 - \delta i_1)^2 \cdot L}{2} = V_b \left( i_1 - \frac{\delta i_1}{2} \right) b \cdot T \qquad \text{Equation 3}$$

where $i_1$ is an initial coil current at the beginning of the charging interval b·T and L is an inductance of the antenna 2-114. When $\delta i_1$ is substantially smaller than $i_1$, Equation 2 is approximated by Equation 4:

$$\frac{2 \cdot i_1 \cdot \delta i_1 \cdot L}{2} \approx V_b \cdot i_1 \cdot b \cdot T \qquad \text{Equation 4}$$

which is equivalent to Equation 5:

$$\delta i_1 \approx \frac{V_b \cdot b \cdot T}{L} \qquad \text{Equation 5}$$

In an embodiment, a range for a frequency of the charging control signal CCTL is determined using Equations 1-5 so that the modulation of the coil current $i_L$ during the charging interval b·T is small. For example, for a battery voltage $V_b$ of 5 volts, an inductance L of the antenna 2-114 of 2 microhenries, a capacitance C1 of 75 picofarads, an initial coil current $i_1$ of 0.5 A, and a $\delta i_1$ of 12.5 mA, a rise time $T_r$ is 0.75 nanoseconds and a charging interval b·T is 5 nanoseconds.

A circulating current $i_{C3}$ through the first through fourth diodes 2-224a through 2-224d and the battery 2-120 or through the first and second transistors 2-220a and 2-220b is determined according to the induced antenna voltage $V_1$ less the fundamental component $v_b$ of the charging voltage Vwc. At resonance, the circulating current $i_{C3}$ is determined by Equation 6:

$$\begin{aligned} i_{C3} &= \frac{C_3}{R(C_1+C_3)} \left( v_1 - v_b \frac{C_3 + j\omega C_1 R(C_1+C_3)}{C_1+C_3} \right) \qquad \text{Equation 6} \\ &\approx \frac{3}{4R} \left( v_1 - v_b \left( \frac{3}{4} + \frac{j}{4Q} \right) \right) \text{ as } C_3 \approx 3C_1 \\ &\approx \frac{3}{4R} \left( v_1 - \frac{3}{4} v_b \right) \text{ as } Q \gg 1 \end{aligned}$$

where $C_3$ is a combined capacitance of the first and second WC tuning capacitors 2-210a and 2-210b, j is the square root of $-1$, R is a series loss resistance of the antenna 2-114, Q is a coil quality factor of the antenna 2-114, and $v_b = 4 \cdot b \cdot V_b / \pi$.

A charging current $I_B$ through the battery 2-120 is an average of the pulses received by the battery 2-120 through the first through fourth diodes 2-224a through 2-224d, according to Equation 7:

$$\begin{aligned} I_B &= \frac{2}{\pi} b \frac{3 \left( v_1 - \frac{3}{4} \cdot \frac{4}{\pi} b \cdot V_b \right)}{4R} \qquad \text{Equation 7} \\ &= \frac{3b \left( v_1 - \frac{3}{\pi} b \cdot V_b \right)}{2\pi R} \end{aligned}$$

A maximum current charging duty cycle $b_{Imax}$, that is, a value of the charging duty cycle b that maximizes the charging current $I_B$, is determined using Equation 8:

$$b_{Imax} = \frac{\pi v_1}{6 V_b} \qquad \text{Equation 8}$$

A maximum charging current $(I_B)_{max}$ when the charging duty cycle b equals the maximum current charging duty cycle $b_{Imax}$ is determined using Equation 9:

$$(I_B)_{max} = \frac{v_1^2}{8 V_b \cdot R} \qquad \text{Equation 9}$$

When the charging current $I_B$ is equal to the maximum charging current $(I_B)_{max}$, a charge power $P_B$ is determined using Equation 10:

$$P_B = \frac{v_1^2}{8R} \qquad \text{Equation 10}$$

When the charging current $I_B$ is equal to the maximum charging current $(I_B)_{max}$, an input power $P_H$ is determined using Equation 11:

$$P_H = \frac{v_1^2}{4R}$$

Equation 11

Accordingly, when the charging current $I_B$ is equal to the maximum charging current $(I_B)_{max}$, the ratio of the charge power $P_B$ to the input power $P_H$ is equal to 0.5.

When the charging current $I_B$ is not equal to the maximum charging current $(I_B)_{max}$, the values described above are determined according to Equations 12 through 16:

$$i_1 = \frac{1}{R}\left(v_1 - \frac{3}{\pi}b \cdot V_b\right)$$

Equation 12

$$I_B = \frac{3b}{2\pi R}\left(v_1 - \frac{3}{\pi}b \cdot V_b\right)$$

Equation 13

$$P_B = \frac{3b \cdot V_b}{2\pi R}\left(v_1 - \frac{3}{\pi}b \cdot V_b\right)$$

Equation 14

$$P_H = \frac{v_1}{2R}\left(v_1 - \frac{3}{\pi}b \cdot V_b\right)$$

Equation 15

$$\frac{P_B}{P_H} = \frac{3}{\pi}b\frac{V_b}{v_1}$$

Equation 16

When the charging duty cycle b is below a point of inflection, that is, below the maximum current charging duty cycle $b_{Imax}$, the charging current $I_B$ increases monotonically with increases of the charging duty cycle b. In an embodiment, the charging duty cycle b is below the point of inflection and the charging current $I_B$ is controlled to a desired level using a negative feedback loop controlling the charging duty cycle b, and the charging current $I_B$ is limited to a maximum value using a the negative feedback loop under all conditions, so that when the charging duty cycle b exceeds the point of inflection, a feedback occurs that reduces the charging duty cycle b back to the point of inflection.

Figure 4A:
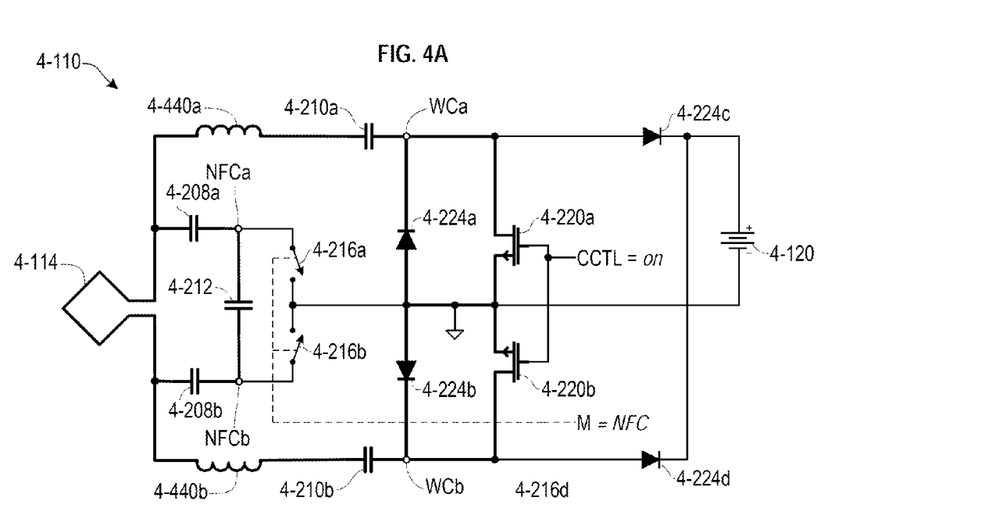
FIGS. 4A-4C are views of a circuit diagram of a tuner/converter, each view of the circuit diagram showing an operation of the circuit according to an embodiment.
Figure 4B:
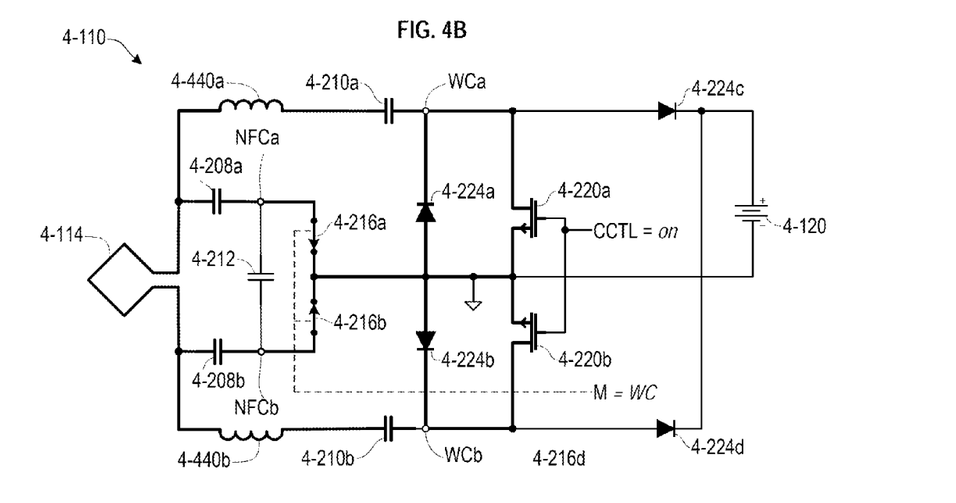
Figure 4C:
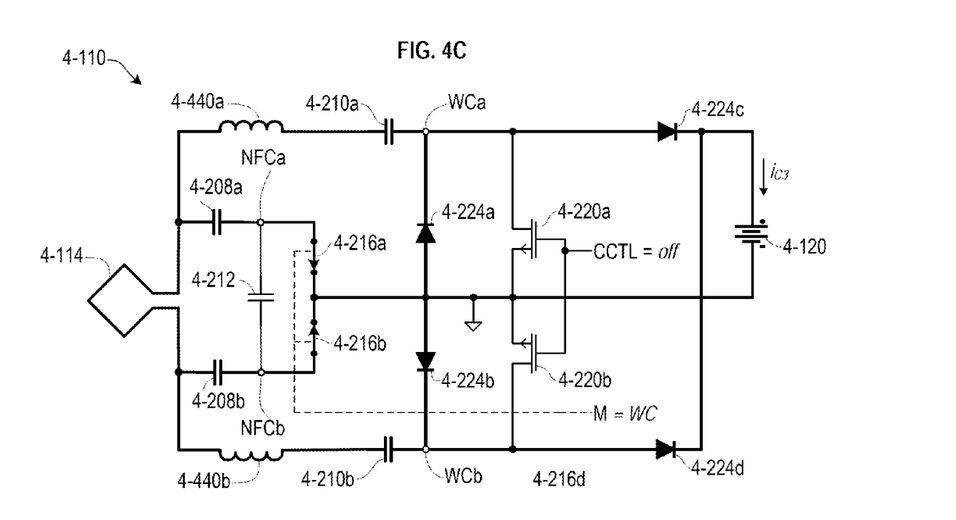

FIGS. 4A-4C are views of a circuit diagram of a circuit 4-110 suitable for use in tuner/converter 1-110 of FIG. 1, according to an embodiment. Each of the views of the circuit 4-110 shows an operation of the circuit 4-110. Elements of the circuit 4-110 having reference characters of the form "4-2XX" correspond to similarly-numbered elements of the circuit 2-110 shown in FIG. 2. For example, a first NFC tuning capacitor 4-208a of the circuit 4-110 corresponds to the first NFC tuning capacitor 2-208a of the circuit 2-110.

The circuit 4-110 differs from the circuit 2-110 by addition of a first WC tuning inductor 4-440a and a second WC tuning inductor 4-440b. The first WC tuning inductor 4-440a is connected between a first terminal of an antenna 4-114 and a first terminal of a first WC tuning capacitor 4-210a. The second WC tuning inductor 4-440b is connected between a second terminal of the antenna 4-114 and a first terminal of a second WC tuning capacitor 4-210b.

Another difference is that in the circuit 4-110, the anode of the third diode 4-224c is connected to a first WC pad WCa, and the anode of the fourth diode 4-224d is connected to a second WC pad WCb. Accordingly, the circuit 4-110 includes a first switch 4-216a and a second switch 4-216b corresponding to the first switch 2-216a and the second switch 2-216b of the circuit 2-110 of FIG. 2, but does not contain a switch corresponding to the third switch 2-216c or the fourth switch 2-216d of the circuit 2-110.

FIG. 4A shows the circuit 4-110 during an NFC operation. A mode signal M receives an NFC signal and a charging control signal CCTL receives an on signal. Therefore the switches 4-216a and 4-216b are open and a first transistor 4-220a and a second transistor 4-220b are switched on. Components of the circuit 4-110 that are active while the circuit 4-110 is configured for the NFC operation are shown in FIG. 4A using bold lines.

Using the turned-on transistors 4-220a and 4-220b, the WC pads WCa and WCb are connected to ground and the WC tuning capacitors 4-210a and 4-210b are connected in series. Unless the antenna 4-114 and the WC tuning inductors 4-440a and 4-440b are fully inductively coupled, the resulting LC circuit will have a first resonance frequency and a second resonance frequency. Preferably, there is no inductive coupling between the antenna 4-114 and either of the WC tuning inductors 4-440a and 4-440b. In an embodiment, the WC tuning inductors 4-440a and 4-440b may be inductively coupled to each other.

When the antenna 4-114 and the WC tuning inductors 4-440a and 4-440b are not fully inductively coupled, the network comprising the antenna 4-114, the WC tuning capacitors 4-210a and 4-210b, the WC tuning inductors 4-440a and 4-440b, and the NFC tuning capacitors 4-208a, 4-208b, and 4-212 has first and second resonant frequencies. The components are selected to produce the first resonance frequency having an NFC frequency when the switches 4-216a and 4-216b are open, and the second resonance frequency having a WC frequency when the switches 4-216a and 4-216b are closed. The desired resonances can be obtained if the WC tuning inductors 4-440a and 4040b are sufficiently large, such as when $$L2a+L2b>2L$$

Equation 17 where L2a is an inductance of the first WC tuning inductor 4-440a, L2b is an inductance of the second WC tuning inductor 4-440b, and L is the inductance of the antenna 1-114. Accordingly, in an embodiment, during an NFC operation the signal between the NFC pads NFCa and NFCb has a resonance at an NFC frequency of 13.56 MHz, and during a WC operation including an A4WP wireless charging operation the signal between the WC pads WCa and WCb has a resonance at an A4WP frequency of 6.78 MHz.

FIGS. 4B and 4C show the circuit 4-110 configured for a WC operation with the mode signal M having a WC mode signal. FIG. 4B shows a non-charging portion of the WC operation, and FIG. 4C shows a charging portion of the WC operation. Components that are active while the circuit 4-110 is configured for each of the charging and non-charging portions of the WC operation are shown in FIG. 4B and FIG. 4C, respectively, using bold lines.

The operation of the charging control signal CCTL when the circuit 4-110 is configured for a WC operation corresponds to the operation of the charging control signal CCTL when the circuit 2-110 of FIG. 2 is configured for a WC operation, as described above. Accordingly, the waveforms shown in FIG. 3, described above with respect to the circuit 2-110, also relate to the circuit 4-110.

FIG. 4B shows the circuit 4-110 during the non-charging portion of the WC operation. The mode signal M receives a WC signal and the charging control signal CCTL receives an on signal. Therefore the switches 4-216a and 4-216b are closed and the first transistor 4-220a and the second transistor 4-220b are switched on.

The switches 4-216a and 4-216b being closed protects the NFC pads NFCa and NFCb from high voltages during the WC operation, and prevents the third NFC capacitor 4-212 having an effect on the circuit 4-110. A coil current $i_L$ flows at a WC frequency ω through the transistors 4-220a and 4-220b.

FIG. 4C shows the circuit 4-110 during the charging portion of the WC operation. The mode signal M receives a WC signal and the charging control signal CCTL receives an off signal. Therefore the switches 4-216a and 4-216b are closed and the first transistor 4-220a and the second transistor 4-220b are switched off Components of the circuit 4-110 that are active while the circuit 4-110 is configured for the charging portion of the WC operation are shown in FIG. 4C using bold lines.

When the transistors 4-220a and 4-220b are switched off by the charging control signal CCTL, a magnitude of a charging voltage Vwc across the WC pads WCa and WCb rises to a threshold value. For example, the threshold value is equal to the voltage $V_B$ of the battery 4-120 plus two forward diode voltages associated with two diodes among the first through fourth diodes 4-224a through 4-224d. When the magnitude of the charging voltage Vwc reaches the threshold value, a charging current $I_{C3}$ flows through the battery 4-120 and two diodes among the first through fourth diodes 2-224a through 2-224d. Specifically, when the charging voltage Vwc is positive and has a magnitude equal to the threshold value, the charging current $I_{C3}$ flows through the third diode 2-224c, the battery 2-120, and the second diode 2-224b. When the charging voltage Vwc is negative and has a magnitude equal to the threshold value, the charging current $I_{C3}$ flows through the fourth diode 2-224d, the battery 2-120, and the first diode 2-224a.

The transistors 4-220a and 4-220b of circuit 4-110 are subjected to lower voltages than the corresponding transistors 2-220a and 2-220b of the circuit 2-110 shown in FIG. 2. As explained above, the transistors 2-220a and 2-220b of the circuit 2-110 each have a breakdown voltage greater than the peak coil voltage of the NFC operation, e.g., 10-12 volts. In contrast, transistors 4-220a and 4-220b of circuit 4-110 each have a breakdown voltage greater than the sum of the battery voltage $V_B$ of the battery 2-120 and a voltage drop across the diodes 4-224a through 4-224d; for example, a breakdown voltage of 5 volts.

The transistors 4-220a and 4-220b have lower breakdown voltages because the transistors 4-220a and 4-220b are each connected across the terminals of the battery 4-120 through the full-wave rectification means embodied in the diodes 4-224a through 4-224d during all portions of the WC operation and are switched on, providing a low resistance path, during the NFC operation. As a result, all of the reactive components—that is, the capacitors and inductors—of the circuit 4-110 are each always part of a closed circuit.

When the WC tuning inductors 4-440a and 4-440b have low losses, an energy stored in the WC tuning inductors 4-440a and 4-440b and the antenna 4-114 is larger than an energy stored in the antenna 2-114 of the circuit 2-110 of FIG. 2. Therefore, given the same clock frequency (that is, the same clock period T), the fraction of the energy stored that is extracted in each charging portion of the WC operation is smaller in the circuit 4-110 of FIG. 4 than in the circuit 2-110 of FIG. 2. As a result, a wider range of clock periods T may be used in the circuit 4-110 of FIG. 4 compared to that in the circuit 2-110 of FIG. 2.

The Equations 1 through 16, discussed above in the context of the circuit 2-110 of FIG. 2, may be adapted for use with the circuit 4-110 of FIG. 4.

Based on the teachings and disclosures herein, a person of skill in the art could envisage single-ended versions of the embodiments described herein.

Figure 5:
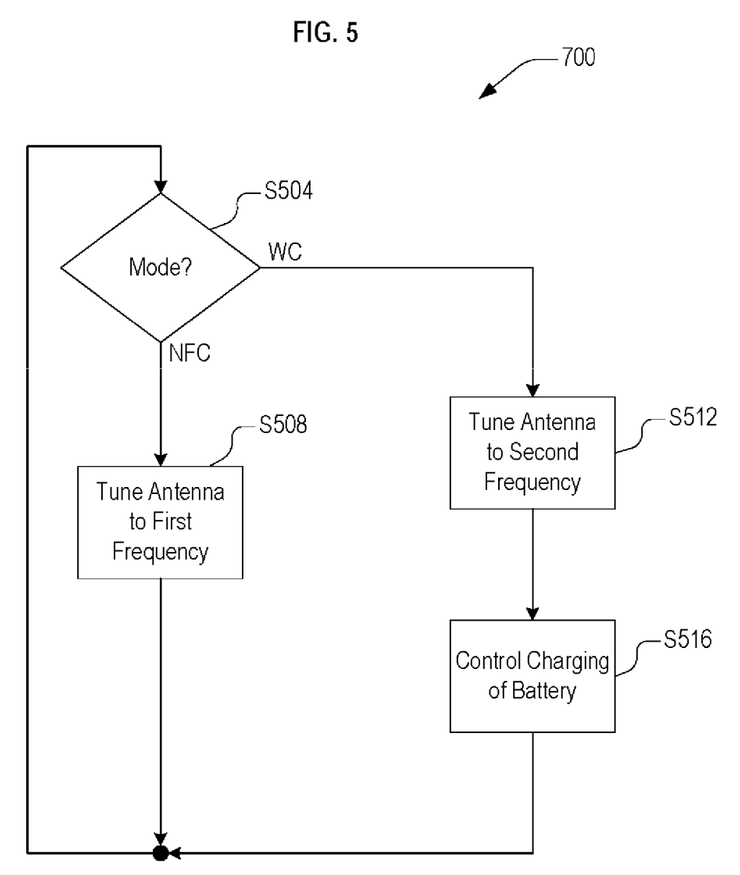
FIG. 5 is a flowchart of a process for wireless power reception according to an embodiment.

FIG. 5 is a flow chart of a process 500 for wireless power reception according to an embodiment. The process 500 is suitable for use in the tuner/converter 1-110 of FIG. 1.

At S504, a mode is determined. In an embodiment, the mode is determined according to one or more of a received wireless communication, a battery charge level, and a charging priority relative to an NFC priority. When the mode is determined to be an NFC mode, at S508 an antenna is tuned to, that is, has a resonance at, a first frequency. The first frequency may be 13.56 MHz.

When the mode is determined to be an WC mode, at S512 the antenna is tuned to, that is, has a resonance at, a second frequency. The second frequency may be 6.78 MHz. Then at S516, a charging current generated using the antenna is controlled to charge a battery or other electrical energy storage device.

Figure 6:
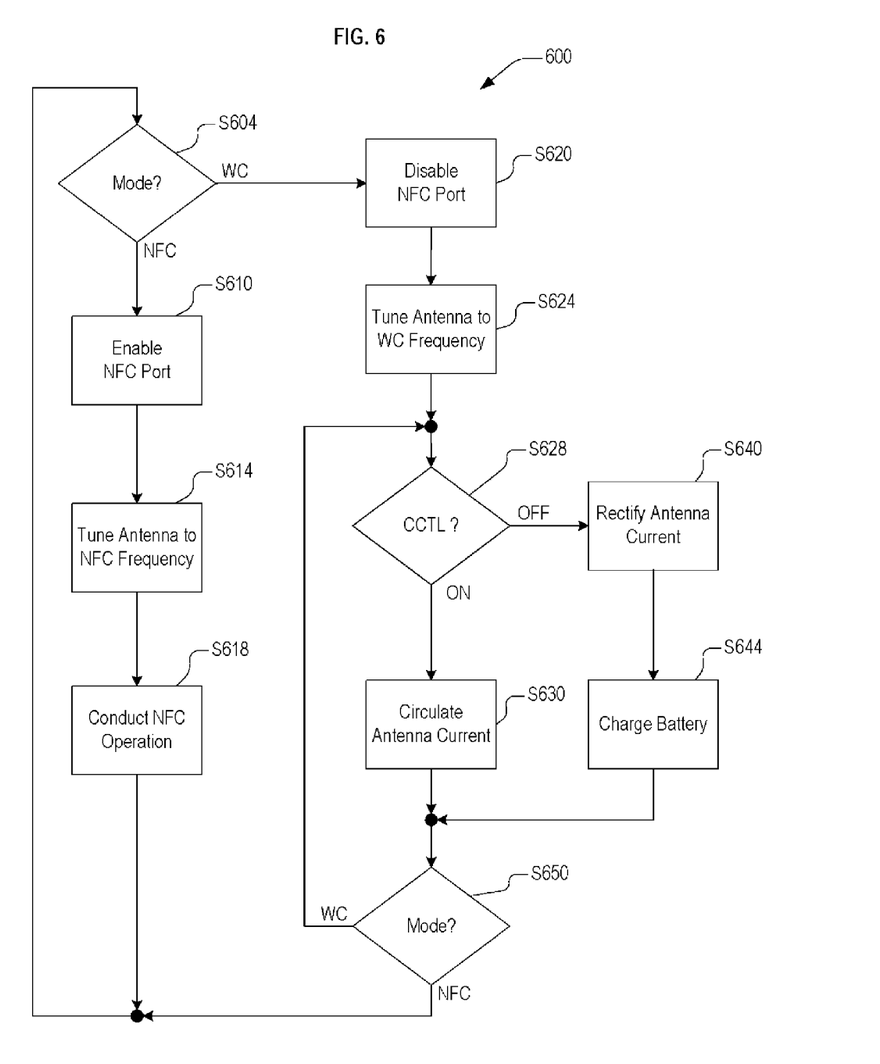
FIG. 6 is a flowchart of another process for wireless power reception according to an embodiment.

FIG. 6 is a flow chart of a process 600 for wireless power reception according to an embodiment. The process 600 is suitable for use in the tuner/converter 1-110 of FIG. 1.

At S604, a mode signal is received. When the mode signal includes a first mode signal, e.g., an NFC mode signal, the process 600 proceeds to S610. When the mode signal includes a second mode signal, e.g., a WC mode signal, the process 600 proceeds to S620.

At S610, an NFC port is enabled. Enabling the NFC port allows NFC signals to be communicated through the NFC port.

At S614, an antenna is tuned to a first frequency, for example, an NFC frequency of 13.56 MHz. Tuning the antenna includes altering the effective capacitance and/or inductance of one or more reactive circuits connected to the antenna. Altering an effective capacitance and/or inductance includes opening or closing a switching device connected in series with a reactive circuit or opening or closing a switching device connected across a reactive circuit.

At S618, an NFC operation is performed. The NFC operation includes transmitting and/or receiving NFC signals using the antenna and the NFC port.

While the mode signal includes the NFC mode signal, the process 600 repeats S604, S610, S614, and S618.

Turning to when the mode signal includes the WC mode signal, at S620, the NFC port is disabled. Disabling the NFC port protects the NFC port from voltages induced on the antenna during a WC operation.

At S624, the antenna is tuned to a second frequency, for example, an A4WP wireless charging frequency of 6.78 MHz. Tuning the antenna includes altering the effective capacitance and/or inductance of one or more reactive circuits connected to the antenna.

At S628, a Charging Control (CCTL) signal is received. When the CCTL signal includes a first control signal, e.g., an on signal, the process 600 proceeds to S630. When the CCTL signal includes a second control signal, e.g., an off signal, the process 600 proceeds to S640. The CCTL signal alternates between the on signal and the off signal at a third frequency substantially greater than the second frequency. In an embodiment where the second frequency is an A4WP wireless charging frequency, the third frequency is between 50 and 100 MHz.

At S630, an antenna current of the antenna is circulated. The antenna current includes a current induced in the antenna by a WC transmission and oscillating at the second frequency. In an embodiment, the alternation of the CCTL signal is synchronized to the antenna current so that the off signal occurs at one or more substantially identical temporal offsets within each cycle of the second frequency.

Turning to when the CCTL signal includes the off signal, at S640, the antenna current is rectified to generate a rectified current having only one polarity. Rectifying the antenna current extracts energy from the antenna.

At S644, a battery is charged using the rectified current. Charging the battery using the rectified current transfers energy from the antenna to the battery. A charging current of the battery is controlled using a duration of the off signal.

At S650, when the mode signal continues to includes the WC mode signal, the process 600 proceeds to S628. When the mode signal instead includes the NFC mode signal, the process 600 proceeds to S604.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A circuit comprising:
   an antenna;
   a first port coupled to the antenna using a first reactive circuit, the first port including first and second input nodes;
   a first switching device coupled across the first and second input nodes of the first port and configured to convey a signal across the first and second input nodes to a Near Field Communication (NFC) circuit in a first mode, wherein the antenna has a resonance at a first frequency, and to isolate the NFC circuit from the antenna in a second mode;
   a second port coupled to the antenna using a second reactive circuit, the second port including first and second input nodes;
   a rectifier having an input coupled to the second port and an output coupled to an energy storage device; and
   a second switching device configured to control an amount of current flowing through the rectifier, the second switching device being connected across the first and second input nodes of the second port,
   wherein when the circuit is in a second mode, the antenna is tuned to have a second resonance at a second frequency and the second switching device alternates between a first state and a second state at a third frequency equal to or higher than the second frequency.

2. The circuit of claim 1, wherein a coil current flows through the antenna, the second reactive circuit and the second switching device when the second switching device is in the second state,
   wherein a charging current flows through the rectifier to charge the energy storage device when the second switching device is in the first state, and
   wherein an average magnitude of the charging current flowing through the energy storage device is controlled by varying a duration of the second switching device being in the first state.

3. The circuit of claim 1, further including a third switching device being connected between the input of the rectifier and the second port, wherein when the circuit is configured in the first mode, the third switching device is the first state, and when the circuit is configured in the second mode, the third switching device is in the second state.

4. The circuit of claim 1, wherein the first switching device is in an open state when the first switching device is in the first state and a closed state when the first switching device is in the second state, and
   wherein the second switching device is in a closed state when the circuit is in the first mode.

5. The circuit of claim 1, wherein the second switching device is in a nonconductive state when the second switching device is in the first state and a conductive state when the second switching device is in the second state.

6. The circuit of claim 1, wherein the antenna is a Near Field Communication (NFC) antenna, and the first frequency is 13.56 MHz.

7. The circuit of claim 6, wherein the second frequency is an Alliance for Wireless Power (A4WP) frequency of 6.78 MHz, and the second mode is an A4WP charging mode.

8. The circuit of claim 1, wherein the first reactive circuit includes a capacitor.

9. The circuit of claim 1, wherein the second reactive circuit includes a capacitor.

10. The circuit of claim 9, wherein the second reactive circuit further includes an inductor.

* * * * *